2 Sheets—Sheet 1.
J. K. UNDERWOOD & G. B. St. JOHN.
Rotary Plow.
No. 233,455. Patented Oct. 19, 1880.
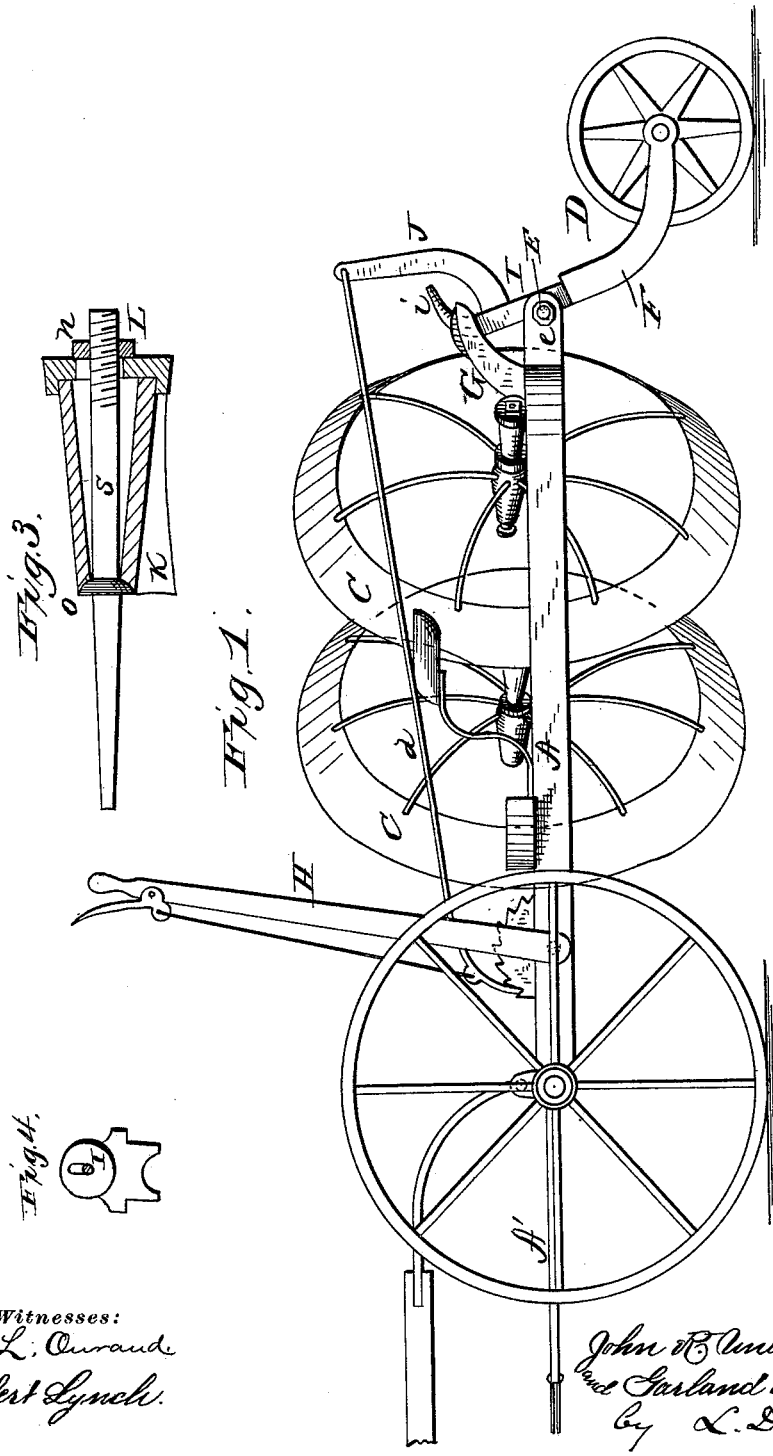
Witnesses:
F. L. Ouraud
Robert Lynch
Inventor:
John K. Underwood
and Garland B. St. John
by L. Deane
Atty.

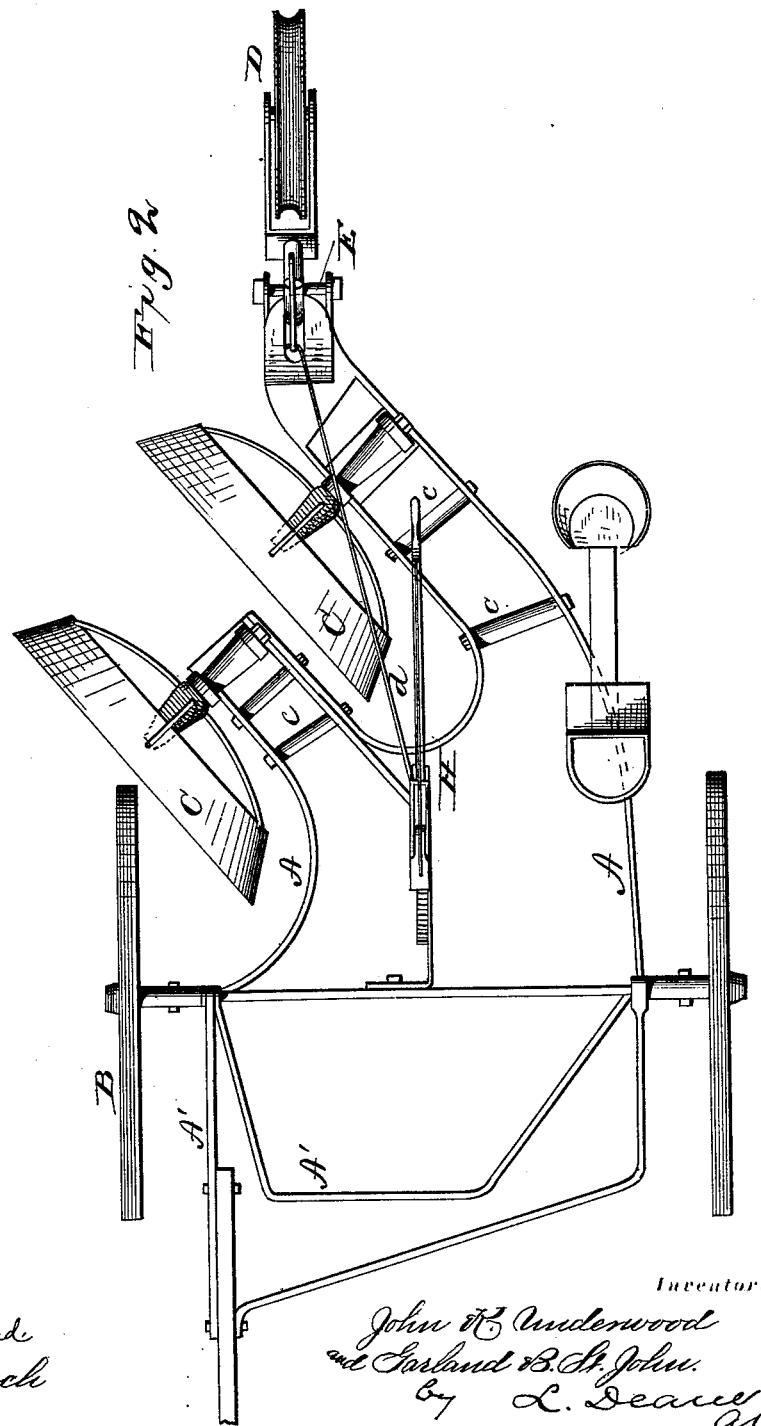

UNITED STATES PATENT OFFICE.

JOHN K. UNDERWOOD AND GARLAND B. ST. JOHN, OF CEDAR RAPIDS, IOWA.

ROTARY PLOW.

SPECIFICATION forming part of Letters Patent No. 233,455, dated October 19, 1880.

Application filed February 16, 1880.

*To all whom it may concern:*

Be it known that we, JOHN K. UNDERWOOD and GARLAND B. ST. JOHN, of the city of Cedar Rapids, in the county of Linn and State of Iowa, have invented certain new and useful Improvements in Rotary Plows, of which the following is a specification.

The invention relates to the caster-wheel which governs the depth of the furrow, and the lever in connection therewith, and to the device for shifting the rotary disk to any desired angle, according to the requirements of the soil.

More particularly our object is to so arrange the caster that when the disks are raised out of the ground the wheel is free to track at any angle to the line of draft, as required in turning, but is held rigidly in the line of draft while the plow is in operation, to modify the front of the implement, so that the draft shall tend to relieve the fore wheels of the superincumbent weight and render the operation of shifting the angle of the disks more easy, simple, and expeditious; and in the construction and combination of all the parts, all of which will appear by reference to the following more particular description and the drawings annexed, and forming part of this specification.

In the accompanying sheet of drawings, Figure 1 represents a side elevation of the plow; Fig. 2, a plan view of same; Fig. 3, a sectional view of an axle of the plow-disk as arranged in its shifting device; and Fig. 4, a view of the cap to same.

Similar letters of reference indicate corresponding parts.

The frame A is of any suitable form, the shape designated being preferred. It is made of wrought bar-iron, connected and stayed with thimbles c c, and rigidly fastened to the rear of the axle E. The whole is supported and runs upon two truck-wheels, B B, and a caster-wheel, D. The latter, when the implement is not turning the soil, moves freely to the left and right in turning around.

To enable the caster-wheel when the disks are depressed to fall into and keep the line of draft during the plowing, to the usual swivel is added a very simple device. It consists in prolonging the rotary standard F at its upper end and turning such extension backwardly into the form shown, being nearly at right angles to the journal, or an arc of a circle of which the pivot $e$ is the center. In front of this a guide or lock, G, is fastened firmly to the frame A. It consists in an arm extending upwardly and backwardly in the arc of the same circle above mentioned. Into this arm a recess is formed, as shown in Fig. 2. This recess is made flaring or leading, so that as soon as the upper part of the caster moves forward, as the frame is depressed, the finger $i$ enters whatever the angle of the caster-wheel to the line of draft may be. At its inner extremity this recess is made to fit snugly to the finger $i$. Consequently, when it reaches this point in the process of lowering, the caster-wheel is exactly in line with the fore wheels, and is held securely there so long as the plows are so depressed. The object of this is twofold. It compels the caster-wheel to "track," and, as a consequence, its greater resistance prevents the rear of the plow from sluing in toward land.

Heretofore great inconvenience and vexation have attended the use of the caster-wheel. Instead of following the line of draft its natural tendency is to stand in the angle of the disks to such line, and consequently incline the plow to "run to land." To overcome this difficulty various devices have been adopted, such as a projecting pin or stop which extends below the frame and allows the caster-standard to swing only one way; also, a collar on the standard with a notch, into which a dog is forced by a spring. The present invention is designed to attain the desired ends in a novel and very effectual manner.

The lever H, for raising and depressing the plow-disks C C, is placed so as to come in front of the driver, and is provided with a suitable pawl and ratchet. A rod, $d$, communicates with this lever, and an upwardly-extended arm of the caster-standard J. The lever is thus within easy reach, and the compound leverage secured in this manner facilitates the raising of the plow-disks out of the earth.

A valuable feature in this improvement consists in dividing the lever at its lower end and placing the parts astride the ratchet, with the pawl between them, thereby giving it greater rigidness and neatness in appearance.

To provide for draft the whiffletree may be attached to the forwardly-projecting parts A' A' of the frame. A device for varying the height of the whiffletree may also be added, and thus the whiffletree shifted to suit any quality of soil. By this means the weight will be thrown on the caster-wheel and the draft of the plow relieved.

The improvement in the device for shifting the angle of the plow-disks consists in an axle-block, K, provided with a funnel-shaped chamber, as shown in Fig. 3, for the reception of the stem of the axle. The smaller end of this chamber is countersunk to receive a rounded collar formed on the axle. The stem of the axles is threaded on the end, and, passing through the conical chamber and a slotted cap, L, is held firmly in place by means of the nut n. The angle of the axle and of the disk, as a consequence, is changed by moving the axle-stem in the slot and by turning the cap to any point desired. It will be noticed that the axle-stem may be in the center of the cap, which is its normal position, or at any point between there and the inner circumference of the conical bearing, as well as at any point in said circumference. Therefore the axle may be placed in any and every possible position required in its use. Aside from this advantage, the ease, speed, and accuracy with which it may be adjusted, together with the reduced expense in manufacture, combine to render it an improvement of great value and utility.

Having thus briefly described our invention, what we claim as new, and desire to secure by Letters Patent, is—

1. The combination of the plow-frame A with the pivoted caster-standard F, finger i, and recessed guiding and locking arm G, substantially as and for the purposes set forth.

2. The combination of frame A and plow-disks C with the axle E, pivoted standard F, and finger i, as described, and wheel D, substantially as and for the purposes set forth.

3. In a shifting axle, substantially as described, the collar O, stem S, nut n, and slotted cap L, in combination with the conical chamber or bearing K, substantially as and for the purpose set forth.

In witness whereof we hereto set our hands this 24th day of January, A. D. 1880.

JOHN K. UNDERWOOD.
GARLAND B. ST. JOHN.

In presence of—
R. H. GILMORE,
FRANK S. CLARK.